3,661,889
WATER-INSOLUBLE PHENYL-AZO-PHENYL DYES

Guenter Lange and Hans Guenter Wippel, Ludwigshafen (Rhine), and Rudolf Bermes, Mannheim, Germany, assignors to Badische Anilin- & Soda-Fabrik Aktiengesellschaft, Ludwigshafen (Rhine), Germany
No Drawing. Original application Jan. 10, 1966, Ser. No. 519,425. Divided and this application Feb. 6, 1970, Ser. No. 9,418
Claims priority, application Germany, Jan. 15, 1965, P 15 44 367.1
Int. Cl. C07c *107/06;* C09b *29/08*
U.S. Cl. 260—207.1                                 3 Claims

ABSTRACT OF THE DISCLOSURE

Water-insoluble p-aminoazo dyes bearing a phenoxyacetoxyethyl substituent on the amino nitrogen. These dyes are particularly useful for dyeing synthetic linear polyesters.

---

This application is a division of our copending application Ser. No. 519,425, filed Jan. 10, 1966, now abandoned.

The invention relates to new water-insoluble p-aminoazo dyes having the general Formula I

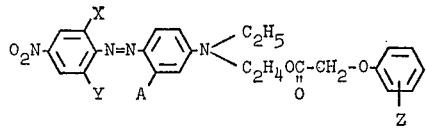

(I)

in which A denotes hydrogen or methyl,
X denotes chlorine, bromine, nitro, cyano, methylsulfonyl, carbomethoxy or carboethoxy,
Y denotes hydrogen, chlorine, bromine or methylsulfonyl and
Z denotes hydrogen or chlorine.

Diazo components for the production of the new dyes have the Formula II

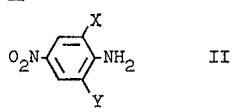

II

X and Y having the meanings given above. Examples of amines of Formula II are:

1-amino-2-cyano-4-nitrobenzene,
1-amino-2-chloro-4-nitrobenzene,
1-amino-2,6-dichloro-4-nitrobenzene,
1-amino-2,4-dinitro-6-bromobenzene,
1-amino-2,4-dinitro-6-chlorobenzene,
1-amino-2,6-dibromo-4-nitrobenzene,
1-amino-2-methylsulfonyl-4-nitrobenzene,
1-amino-2-methylsulfonyl-4-nitro-6-bromobenzene.

The dyes of this invention are eminently suitable, particularly in finely divided form, for dyeing textile material of acetylcellulose, polyamides and particularly linear polyesters. Examples of polyamides are those derived from caprolactam or adipic acid and hexamethylene diamine; examples of polyesters are those derived from terephthalic acid and ethylene glycol or 1,4-dimethylolcyclohexane. Examples of textiles are fibers, flock, yarn, and woven and knitted fabrics.

An industrially preferred group of dyes has the general formula

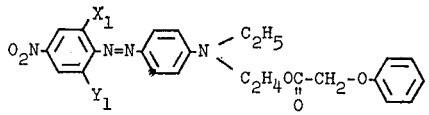

in which $X_1$ denotes cyano or methylsulfonyl, and
$Y_1$ denotes hydrogen, chlorine or bromine.

The dyes of Formula I may be obtained by coupling the diazotized amines of Formula II with the coupling components of Formula III or IV

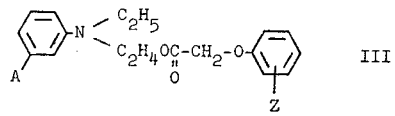

III

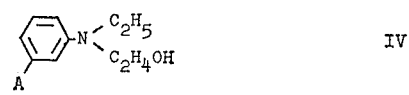

IV and, if the coupling component IV has been used, acylating the hydroxyl group in the coupling product with a compound having the Formula V

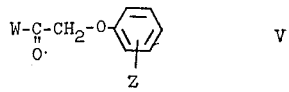

V the symbols A and Z having the meanings given in Formula I and W denoting halogen (namely fluorine, bromine or preferably chlorine) or the radical required to complete an acid anhydride, acid ester or carboxylic acid.

Diazotization, coupling and acylation are carried out by conventional methods. When coupling with a component having the Formula IV, the compound

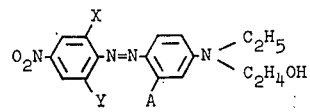

is first obtained. Coupling components having the Formula III to be used according to the invention may be obtained by conventional methods by reaction of acylating agents having the Formula V with the alcohols having the Formula IV.

The same methods may be used in principle for acylating compounds of the Formula IV and compounds of the Formula VI. Acid halides are commonly used for the purpose. When acylating esters, a transesterification catalyst, such as titanium tetraisobutylate, may be used for example; in acylation with carboxylic acids it is advantageous to use an acid catalyst and to carry out the acylation in solvents which are not miscible with water, the water of reaction being removed from the reaction mixture by azeotropic distillation. Among the prior art acid catalysts, p-toluenesulfonic acid is preferred.

Symmetrical acid anhydrides having the Formula V are advantageous and also esters having the Formula V with lower aliphatic alcohols, preferably methyl, ethyl, propyl and butyl esters.

Examples of suitable solvents for the acylation are hydrocarbons, such as benzene and its homologs, halohydrocarbons, such as methylene chloride, ethers, such as diethyl or dioxane, and mixtures of these.

Examples of acid halides having the Formula V are phenoxyacetyl chloride and chlorophenoxyacetyl chloride.

Dyeings obtained on acetylcellulose, polyamides and particularly polyesters with the new dyes are distinguished by good wet fastness and light fastness and also good thermal resistance.

The invention is illustrated by the following examples. Parts given in the examples are parts by weight.

EXAMPLE 1

200 parts of ice is added to an ice-cooled solution of 17.4 parts of 1-amino-2-chloro-4-nitrobenzene in 100 parts of water and 30 parts of concentrated hydrochloric acid and then at 0° to 5° C. a solution of 6.1 parts of sodium nitrite in 20 parts of water is allowed to flow in. The whole is stirred for one hour, any excess of nitrite present is removed by adding sulfamic acid and the diazo solution is filtered. The filtrate is added gradually to a solution of 29.9 parts of N,β-(phenoxyacetoxy)-ethyl-N-ethyl-aniline in a mixture of 100 parts of water, 14 parts of concentrated hydrochloric acid and 200 parts of ice. The whole is stirred for another two hours and the reaction mixture is neutralized with a solution of 42 parts of sodium acetate in 200 parts of water, stirred for another two hours and the crystalline dye is suction filtered. The dye is washed with water until it is neutral and then dried at 50° C. at subatmospheric pressure. It dyes polyethylene glycol terephthalate bright scarlet shades having good fastness to light and sublimation.

By using the diazo components and coupling components listed in the following table and following the procedure described in Example 1, dyes having similar properties are obtained.

| Example No. | Diazo component | Coupling component | Shade of dyeing on polyester |
|---|---|---|---|
| 2 | $O_2N-\underset{Cl}{\bigcirc}-NH_2$ | $\bigcirc-N\underset{C_2H_4OC(=O)-CH_2-O-\bigcirc-Cl}{^{C_2H_5}}$ | Scarlet. |
| 3 | Same as above | $\bigcirc-N\underset{C_2H_4OC(=O)-CH_2-O-\underset{Cl}{\bigcirc}}{^{C_2H_5}}$ | Yellow to scarlet. |

EXAMPLE 4

12 parts of 1-amino-4-nitrobenzene-2-methylsulfone is introduced at 0° C. while stirring into a mixture of 14.5 parts of nitrosylsulfuric acid (having a content of 13.1% of dinitrogen trioxide $N_2O_3$) and 14 parts of concentrated sulfuric acid. Twelve hours later the diazo solution is poured into a coupling solution which consists of 14.95 parts of N,β-(phenoxyacetoxy)-ethyl-N-ethyl-aniline, 50 parts of water, 7 parts of concentrated hydrochloric acid, 100 parts of ice and 1 part of sulfamic acid. The whole is stirred for another two hours, the reaction mixture is neutralized with a solution of 42 parts of sodium acetate in 200 parts of water, stirred for another hour and the crystalline dye is suction filtered, washed with water until neutral and dried at 50° C. under subatmospheric pressure. It dyes polyethylene glycol terephthalate violet shades having very good fastness to light and dry-heat pleating and setting.

By using the diazo components and coupling components set out in the following table instead of the components set out in Example 4, dyes having similar properties are obtained.

| Example No. | Diazo component | Coupling component | Shade of dyeing on polyester |
|---|---|---|---|
| 5 | $O_2N-\underset{Br}{\overset{SO_2CH_3}{\bigcirc}}-NH_2$ | $\bigcirc-N\underset{C_2H_4OC(=O)-CH_2-O-\bigcirc}{^{C_2H_5}}$ | Brown-red. |
| 6 | $O_2N-\underset{NO_2}{\overset{SO_2CH_3}{\bigcirc}}-NH_2$ | $\bigcirc-N\underset{C_2H_4OC(=O)-CH_2-O-\bigcirc}{^{C_2H_5}}$ | Violet. |
| 7 | $O_2N-\underset{Br}{\overset{CN}{\bigcirc}}-NH_2$ | $\bigcirc-N\underset{C_2H_4OC(=O)-CH_2-O-\bigcirc}{^{C_2H_5}}$ | Do. |
| 8 | $O_2N-\overset{CN}{\bigcirc}-NH_2$ | Same as above | Ruby. |
| 9 | $O_2N-\underset{Br}{\overset{NO_2}{\bigcirc}}-NH_2$ | ...do... | Do. |

| Example No. | Diazo component | Coupling component | Shade of dyeing on polyester |
|---|---|---|---|
| 10 | O₂N—⟨Br, Br⟩—NH₂ | Same as Example 7 | Yellow-brown. |
| 11 | O₂N—⟨Cl, Br⟩—NH₂ | do | Do. |
| 12 | O₂N—⟨CO₂CH₃, Br⟩—NH₂ | do | Red-brown. |
| 13–20 | Diazo components of Examples 5–12. | 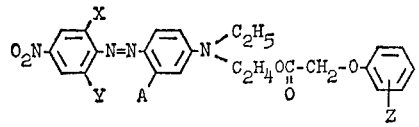 | Orange to violet. |
| 21–28 | do | 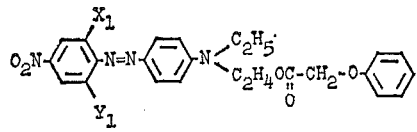 | Do. |

Dyes having similar properties and having a shade displaced toward blue are obtained by using the corresponding m-toluidine derivatives as coupling components instead of the aniline derivatives.

We claim:

1. A dye of the formula $$O_2N-\underset{Y}{\overset{X}{\bigcirc}}-N=N-\bigcirc-N\underset{C_2H_4OC-CH_2-O-\bigcirc}{\overset{C_2H_5}{\underset{O}{\|}}}-\underset{Z}{\bigcirc}$$

in which

A denotes hydrogen or methyl,
X denotes chlorine, bromine, nitro, cyano, methylsulfonyl, carbomethoxy or carboethoxy,
Y denotes hydrogen, chlorine, bromine or methysulfonyl, and
Z denotes hydrogen or chlorine.

2. A dye of the formula:

$$O_2N-\underset{Y_1}{\overset{X_1}{\bigcirc}}-N=N-\bigcirc-N\underset{C_2H_4OC-CH_2-O-\bigcirc}{\overset{C_2H_5}{\underset{O}{\|}}}$$

in which $X_1$ denotes cyano or methylsulfonyl, and
$Y_1$ denotes hydrogen, chlorine or bromine.

3. The dye of the formula:

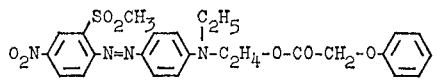

References Cited

UNITED STATES PATENTS 2,249,749   7/1941   Dickey et al. _____ 260—207 X
3,097,198   7/1963   Fishwick et al. ____ 260—207 X JOSEPH REBOLD, Primary Examiner C. F. WARREN, Assistant Examiner U.S. Cl. X.R.

260—473 G, 465 E, 573

PO-1050
(5/69)

UNITED STATES PATENT OFFICE
CERTIFICATE OF CORRECTION

Patent No. 3,661,889          Dated May 9, 1972

Inventor(s) Guenter Lange et al

It is certified that error appears in the above-identified patent and that said Letters Patent are hereby corrected as shown below:

Column 4, Example 6, that portion of the formula reading "$C_2H_4OC$" should read -- $C_2H_4O\underset{\underset{O}{\|}}{C}$ --.

Column 6, Examples 13 to 20, that portion of the formula reading "$C_2H_4OC$" should read -- $C_2H_4O\underset{\underset{O}{\|}}{C}$ --.

Signed and sealed this 19th day of December 1972.

(SEAL)
Attest:

EDWARD M. FLETCHER, JR.          ROBERT GOTTSCHALK
Attesting Officer          Commissioner of Patents